United States Patent
Doraiswamy et al.

(10) Patent No.: US 6,766,180 B2
(45) Date of Patent: Jul. 20, 2004

(54) PREFERENTIAL DEFLECTION HINGE MECHANISM WITH AN IDLER FOR FOLDABLE PORTABLE ELECTRONIC DEVICES

(75) Inventors: Sundarraj Doraiswamy, Longmont, CO (US); Theodore R. Santos, Boulder, CO (US); David Larson, Boulder, CO (US)

(73) Assignee: Qualcomm, Incorporated, San Diego, CA (US)

( * ) Notice: Subject to any disclaimer, the term of this patent is extended or adjusted under 35 U.S.C. 154(b) by 642 days.

(21) Appl. No.: 09/797,310

(22) Filed: Mar. 1, 2001

(65) Prior Publication Data

US 2002/0123366 A1 Sep. 5, 2002

(51) Int. Cl.[7] .................................................. H04B 1/38
(52) U.S. Cl. ................................ 455/575.1; 455/550.1; 455/344; 455/348
(58) Field of Search ............................. 455/550.1, 90.1, 455/344, 349, 575.1, 563, 575.3, 347, 348; 16/277, 329, 321, 331, 332, 342, 344, 347, 303, 330; 220/341, 334, 337, 342, 61.7; 379/433.13; 361/683

(56) References Cited

U.S. PATENT DOCUMENTS

| | | | |
|---|---|---|---|
| 5,923,751 A | * 7/1999 | Ohtsuka et al. | 379/433.13 |
| 6,115,886 A | * 9/2000 | Fujita | 16/330 |
| 6,170,304 B1 | * 1/2001 | Ohta | 70/14 |
| 6,175,990 B1 | * 1/2001 | Kato et al. | 16/334 |
| 6,256,481 B1 | * 7/2001 | Jeong et al. | 455/575.3 |
| 2003/0101538 A1 | * 6/2003 | Koshikawa | 16/277 |

* cited by examiner

Primary Examiner—Edward F. Urban
Assistant Examiner—C. Chow
(74) Attorney, Agent, or Firm—Philip R. Wadsworth; Charles D. Brown; Nicholas J. Pauley

(57) ABSTRACT

A space efficient and cost effective hinge clutch mechanism for facilitating the rotational positioning of a lid member of a portable electronic device relative to the housing the device. The clutch mechanism includes an elongated camshaft extending through a plurality of aligned components including a face cam member, a cam follower, and a compression spring and partially through a hollow retaining member. Rotation of the retaining member prevents the cam-shaft from being inadvertently with drawn. The clutch mechanism may be manually or automatically pre-assembled before insertion into the housing. An idler positioned adjacent to the retaining member serves as conduit for wires extending from the rotating lid member and the housing of the portable electronic device. The interaction of the cam and cam follower retains the lid in its fully open or fully closed positions until sufficient rotational force is exerted on the lid to overcome the tangential force of the spring.

3 Claims, 16 Drawing Sheets

PREFERENTIAL DEFLECTION HINGE MECHANISM WITH AN IDLER FOR FOLDABLE PORTABLE ELECTRONIC DEVICES

BACKGROUND OF THE INVENTION

1. Field of the Invention

This present invention relates to portable electronic devices. More specifically, the present invention relates to hinge clutches employed in portable electronic devices.

2. Description of the Related Art

Portable electronic devices have gained universal acceptance in a variety of applications including, but not limited to, wireless phones, laptop and palmtop computers, cameras as well as entertainment devices. Such applications usually demand durable, lightweight, space-efficient, and ultimately cost effective devices and associated components.

Many portable electronic devices, such as common flip-phones, employ a body member and a separate, foldable lid. The foldable lid is rotationally supported by and attached to the body of the device via at least one clutch hinge mechanism. The clutch hinge allows for manual rotation of the lid from a closed position adjacent the body of the phone to an angular position relative to the phone body to facilitate use of the phone.

Existing clutch hinges, such as face cam clutch mechanisms, typically allow for discreet positioning of the accompanying rotational lid member. One such clutch hinge includes a spring-loaded face cam and cam follower fitted within a cylindrical housing. Either the cam or the cam follower is rigidly connected to the rotational member, such as a flip portion of a wireless phone. During operation, a torque applied to the rotational lid, functions to apply a corresponding torque to the face cam, causing the face cam to rotate and lock into discreet positions with respect to the cam follower. The cam follower compresses or decompresses a spring as the cam rotates relative to the cam follower.

Unfortunately, such movement will often cause unacceptable wear on the hinge housing. Because the housing and components are often made of lightweight and non-durable materials such as ABS or ABS-PC plastic, they often fail well before operating the intended cycles. In addition, the difficulty of inserting the hinge mechanism within the body of the phone may require special tools and procedures. As a consequence, when one of the hinge components fails, the entire assembly is usually discarded and replaced.

Due to the possibility of premature failure, many conventional electronic devices require separate clutch housings for each point of attachment between the housing and the foldable lid. The additional clutch housings facilitate spring-loading of the face cam and cam follower, secure the face cam clutch to the device hinge housing and help to reduce the overall wear of the hinge assembly.

Unfortunately, the need for an additional clutch housing has many shortcomings. The additional clutch housing must be manufactured from durable, relatively expensive materials, which are often unsuitable for very thin-walled designs and are difficult to color. As a result, face cam clutches that employ an additional housing are often excessively bulky and relatively expensive.

Additional clutch housings also require relatively high-tolerance slots in which protrusions, i.e., keys on the cam follower must slide, thereby rotationally fixing the cam follower relative to the additional clutch housing and allowing the cam follower to unduly translate along a longitudinal axis of the clutch. The requisite tolerances represent addition design and manufacturing costs.

In many electronic devices such as flip phones, it is necessary to establish a wire connection between components in the lid and in the housing. Unfortunately, the hinge clutch mechanism when rotated may pinch and even cut such wires, causing failure of the lid-mounted component.

Hence, a need exists in the art for a space-efficient, durable, and cost-effective hinge clutch assembly that allows for discreet positioning of a rotational member relative to housing. Such mechanism should be readily assembled and disassembled without the need for special tools or the need to discard the entire assembly when a component must be replaced. Finally, operation of the mechanism should not interfere with any wire connections extending between the rotational member and the housing.

SUMMARY OF THE INVENTION

The need in the art is addressed by the space-efficient and cost-effective hinge clutch assembly of the present invention. In the illustrative embodiment, the inventive hinge clutch assembly is adapted for use with a portable electronic device and facilitates rotational positioning of a lid member relative to the housing of the device. The hinge clutch assembly includes an elongated cam-shaft having one end adaptable for joint rotation with the lid. A cam follower is mounted on the cam-shaft for joint rotation as well as longitudinal movement along the cam-shaft. A separate cam member is restrained from rotation and a compression spring serves to continuously press the cam follower against the cam member. A cylindrically-shaped retaining member is mounted on an end of the cam-shaft and functions to compress the spring against the cam follower.

The retaining member not only maintains the spring in its compressed position, by sliding the retaining member towards the cam follower, it is possible to further compress the spring, thereby reducing the overall length of the hinge assembly. This, in turn, allows the hinge mechanism to be easily disassembled from the housing and later reassembled.

Another aspect of the present invention resides in the use of a separate idler positioned between the retaining member and an attachment arm of the lid. The spring member compresses the retaining member against the idler to maintain its position in the housing. The idler is formed with a non-symmetrical configuration, which fits with a compatible portion of the housing to prevent the idler from rotating relative to the housing. In addition to supporting the retaining member in its proper position, the idler provides the routing for a wire/flexible circuit between the body of the electronic device and the foldable lid. During assembly, the idler may be displaced along its longitudinal axis to allow the foldable lid to be attached to the body of the electronic device.

Another embodiment of the present invention resides in the simplified method of assembly/disassembly of the hinge mechanism within the housing of the electronic device. The hinge clutch mechanism can be manually or automatically pre-assembled by inserting the cam-shaft through the remaining, aligned components, with the retaining member locking the components against separation. Once pre-assembly is complete, the hinge clutch mechanism can be readily inserted as a unit into the electronic device without the need for any special tools.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
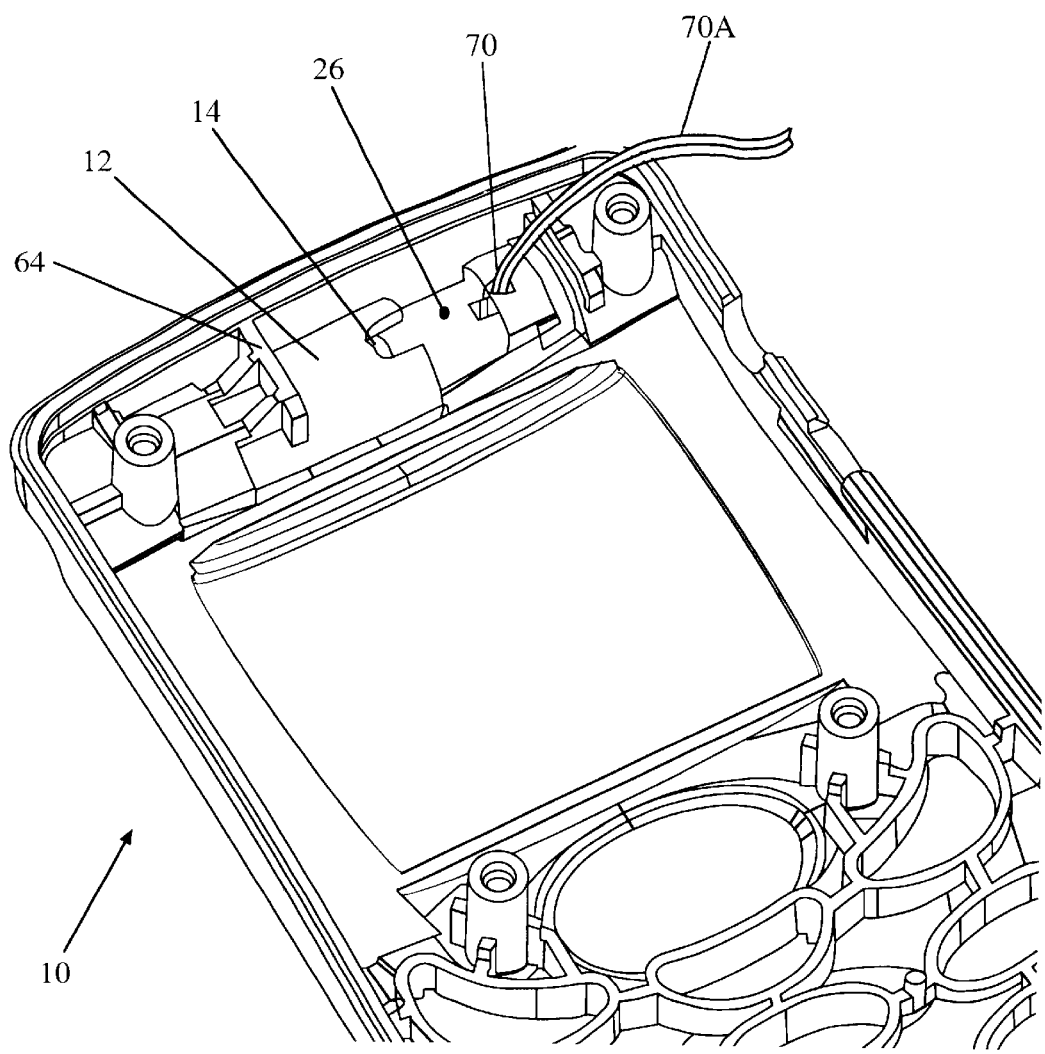
FIG. 1 is partial view of the housing of an electronic device utilizing a face cam clutch assembly formed in accordance with the present invention.
Figure 2:
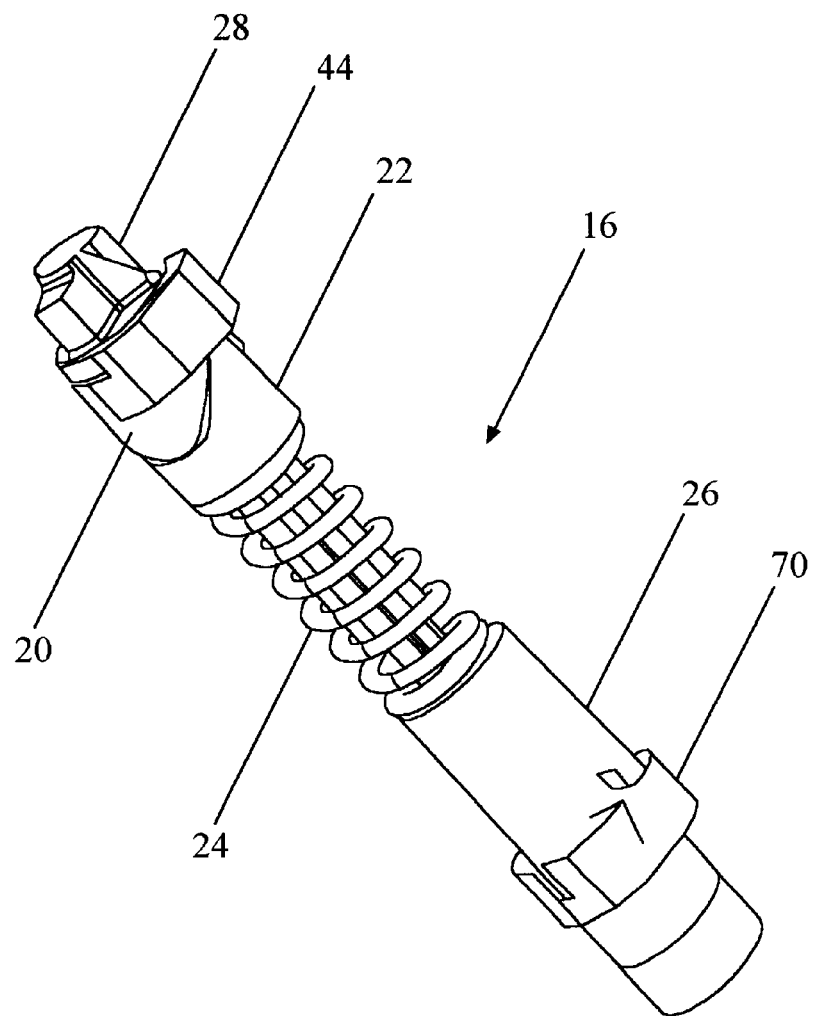
FIG. 2 is an assembled view of the face cam clutch assembly of FIG. 1.

FIG. 1 is a partial view of the housing 10 of an electronic device, which may, for purposes of the following discussion, take the form of a body of a flip phone assembly. Housing 10 may be formed of molded plastic or formed/cast metal and include a hollow, sleeve-shaped portion 12 with an indentation 14 formed on the surface thereof. As will be explained below, a hinge clutch mechanism 16 formed in accordance with the present invention is shown in FIG. 2. The mechanism is specifically designed to be inserted within housing 10 with a portion of the mechanism extending within hollow sleeve 12. Sleeve 12 serves as partial cover for protecting and supporting hinge clutch mechanism 16.

Figure 3:
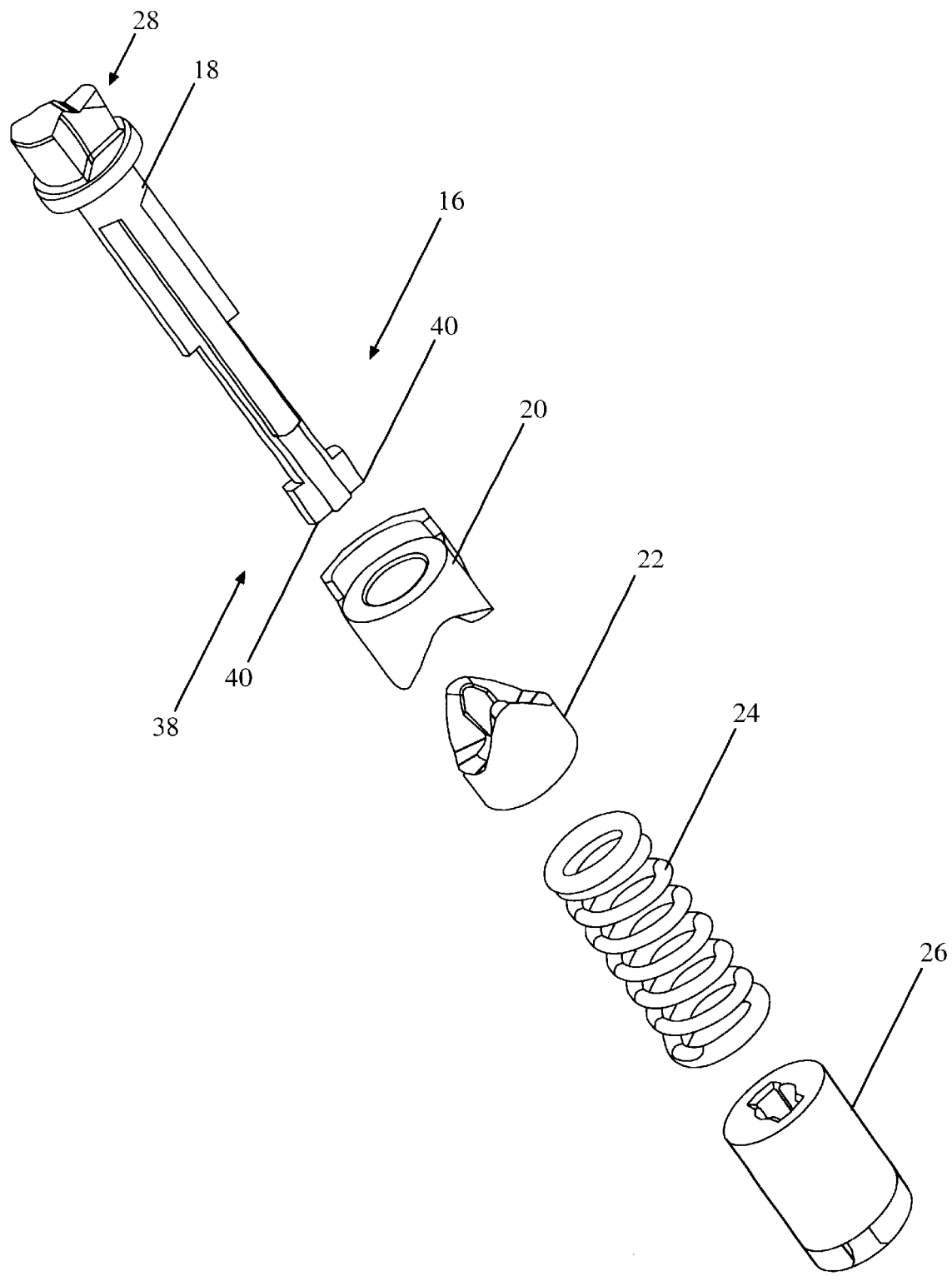
FIG. 3 is an exploded view of a face cam clutch assembly of FIG. 2.

Referring now to FIG. 3, an exploded view of the hinge clutch mechanism 16 includes, from top to bottom, an elongated cam-shaft 18, a face cam member 20, a separate cam follower 22, a compression spring 24 and a retaining member 26.

Figure 4:
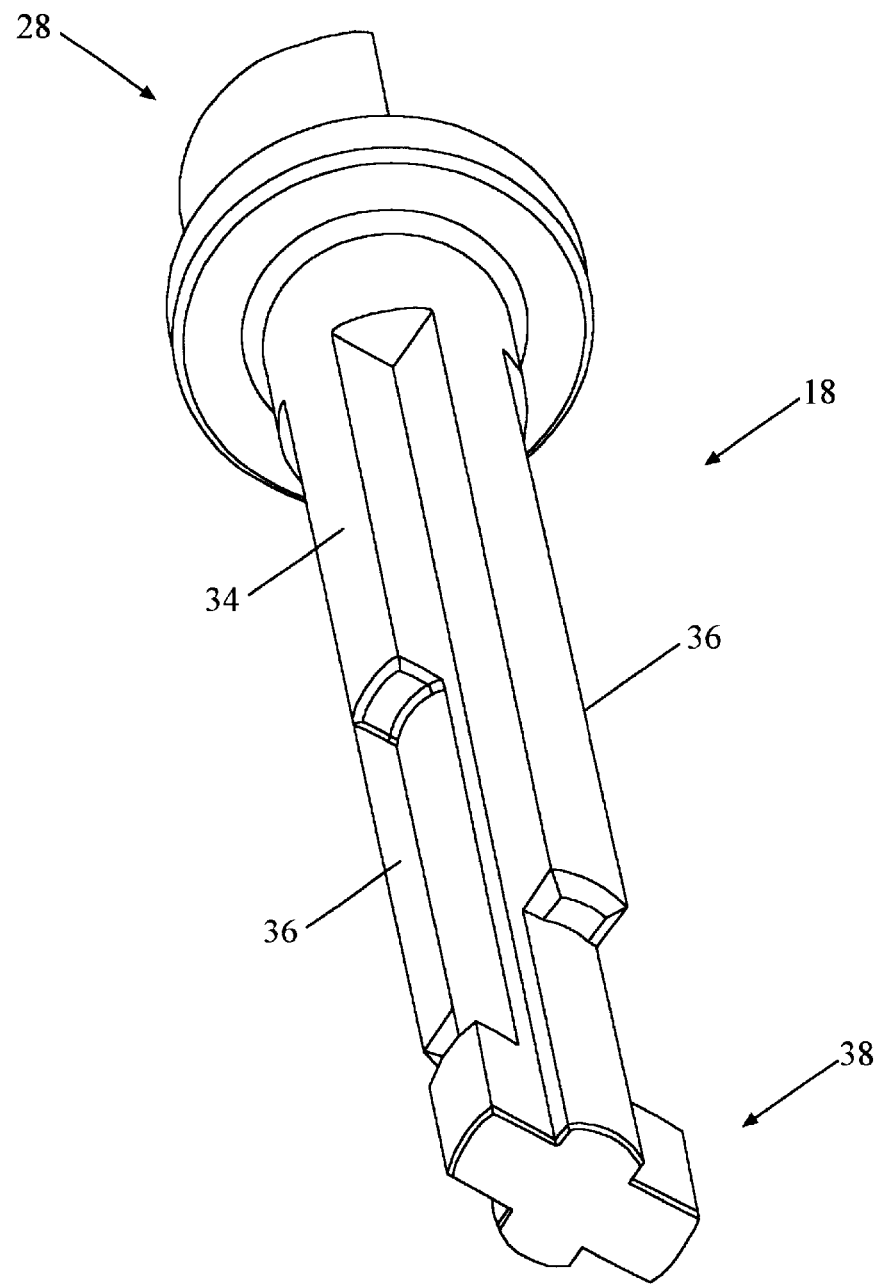
FIGS. 4 and 5 are perspective views of the cam-shaft employed in the cam clutch assembly of FIG. 3.
Figure 5:
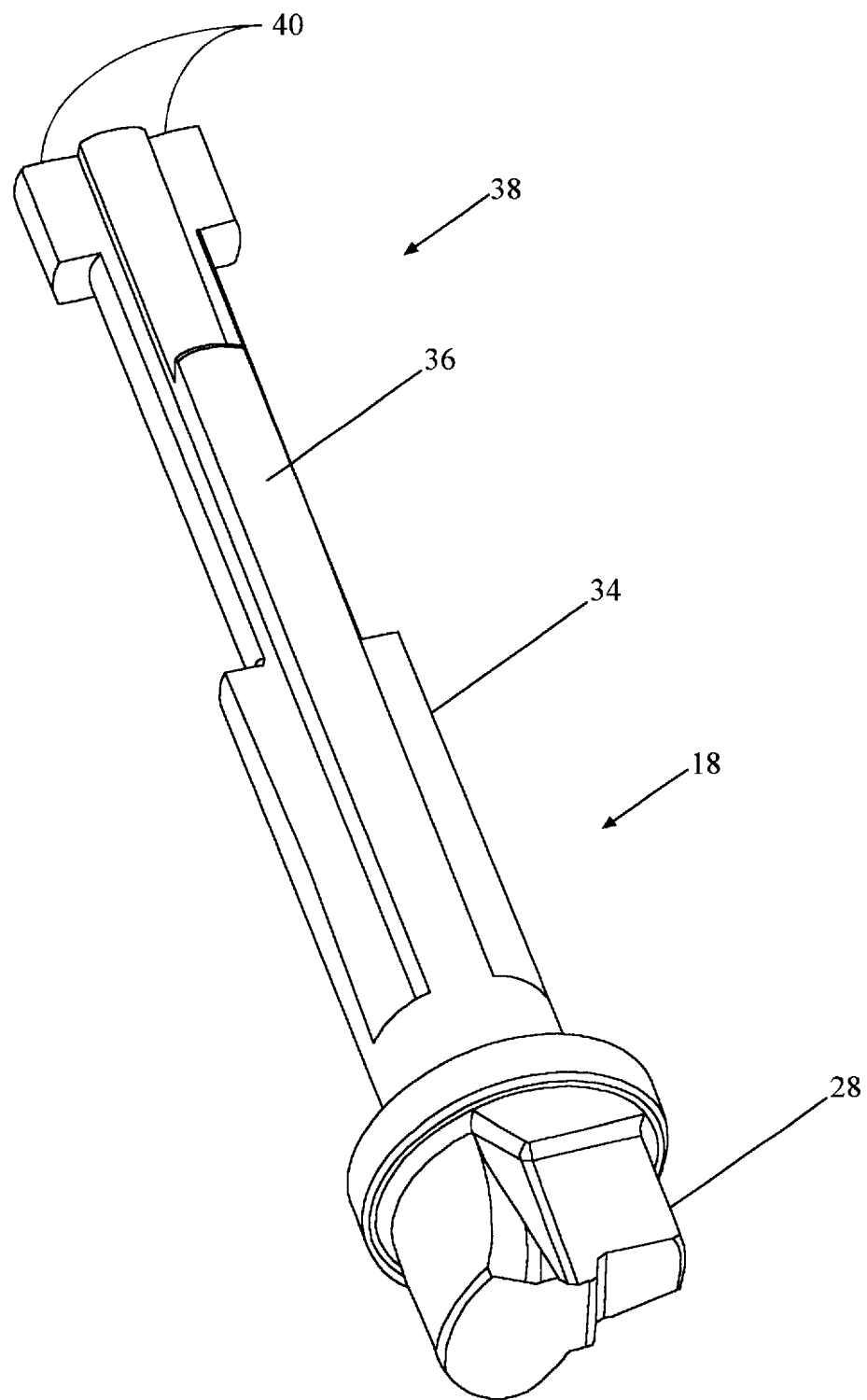
Figure 16:
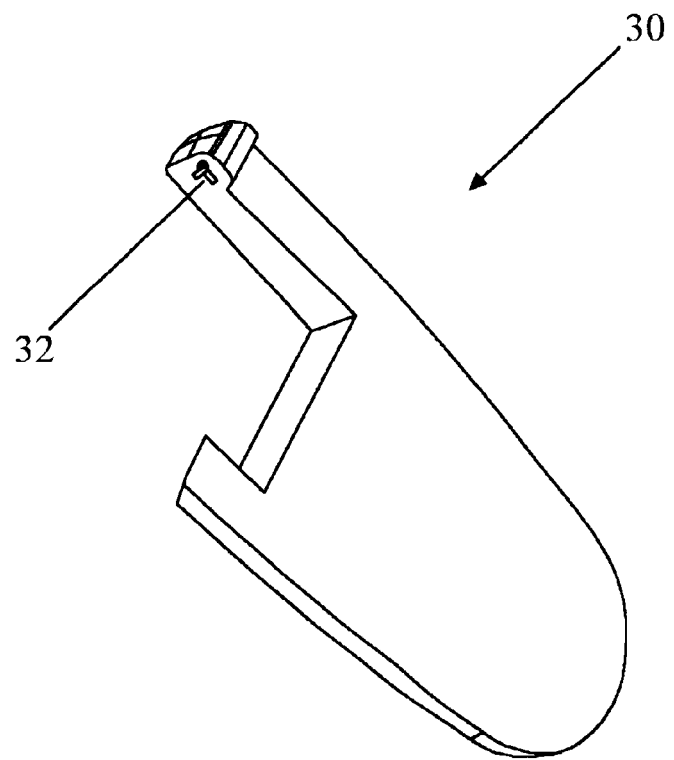
FIG. 16 is a view of the flip lid of the electronic device partially shown in FIG. 1.

As shown in FIGS. 4 and 5, cam-shaft 18 is substantially of rectangular configuration and includes an end portion 28 having a generally "Y" shaped configuration. The rotational lid portion 30 of the portable electronic has a compatible, generally "Y" shaped opening 32 as shown in FIG. 16. It is to be understood that the end portion 28 and the lid opening 32 could be formed of any conventional, compatible shapes that would allow for transmission of torque. When the hinge clutch mechanism 16 is assembled within housing 10, the "Y" shaped end 28 of cam-shaft 18 extends within the "Y" shaped opening 32 of the lid 30. As lid 30 is rotated relative to housing 10, interaction of the end portion 28 with the lid opening 32 causes cam-shaft 18 to rotate in a similar manner. The importance of this rotation will soon become clear.

Cam-shaft 18 includes a first pair of oppositely disposed, substantially-rectangular lands 34 extending generally less than one half the length of cam-shaft 18 starting from end 28. Cam-shaft 18 also includes a second pair of oppositely disposed, substantially rectangular lands 36, wherein each land 36 is positioned approximately 90° from each land 34.

The second pair of lands 36 also extends from end 28 a distance greater than the length of the first pair of lands 34. As will be discussed, the lands 34 and 36 serve to lock cam follower 22 for joint rotation with cam-shaft 18 while allowing cam follower 22 to move along the longitudinal axis of cam-shaft 18.

Cam-shaft 18 includes a further end 38 oppositely disposed from end 28 and formed with a pair of rectangular protrusions 40. The protrusions 40 extend outwardly on opposite sides of cam-shaft 18 and are aligned with lands 34. The protrusions 40 prevent the retaining member 26 from inadvertently separating from cam-shaft 18 in a manner that will become clear.

Figure 6:
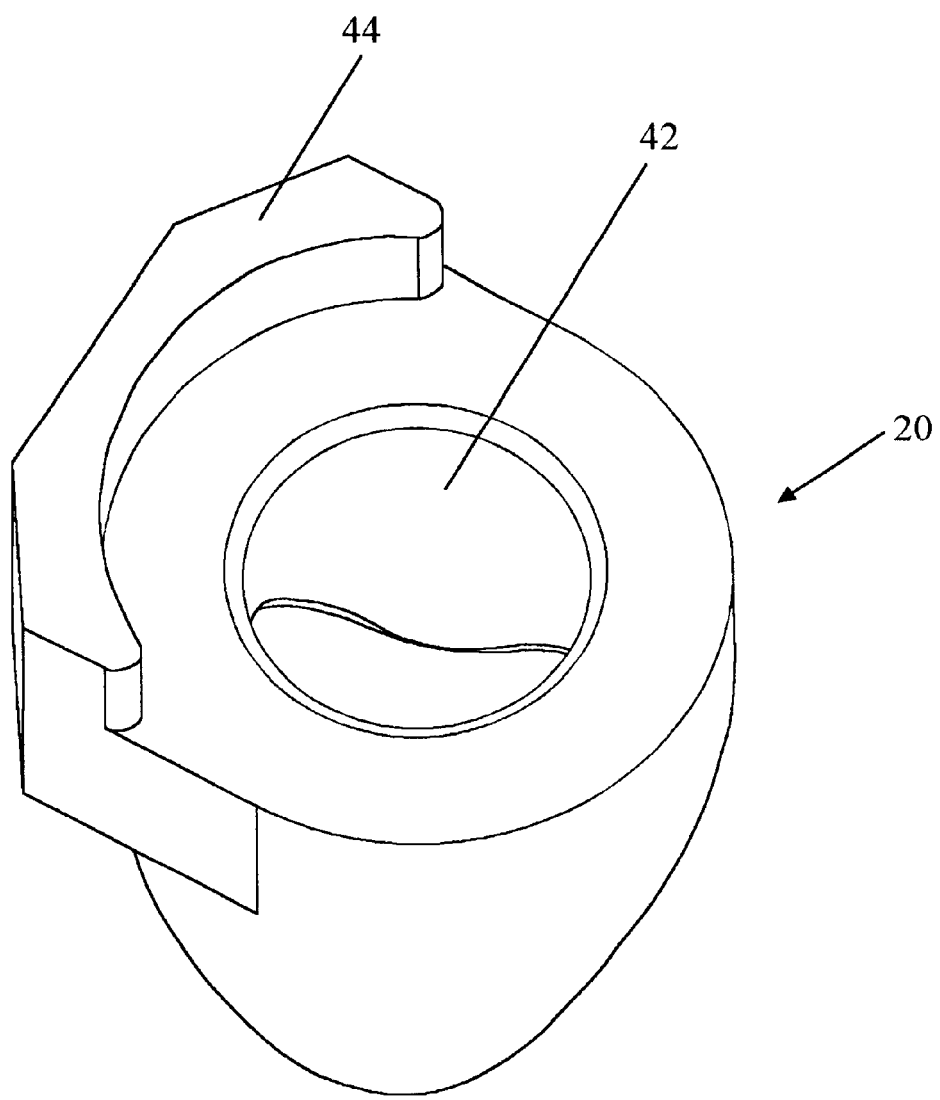
FIGS. 6 and 7 are magnified views of the face cam member employed in the cam clutch assembly of FIG. 3.
Figure 7:
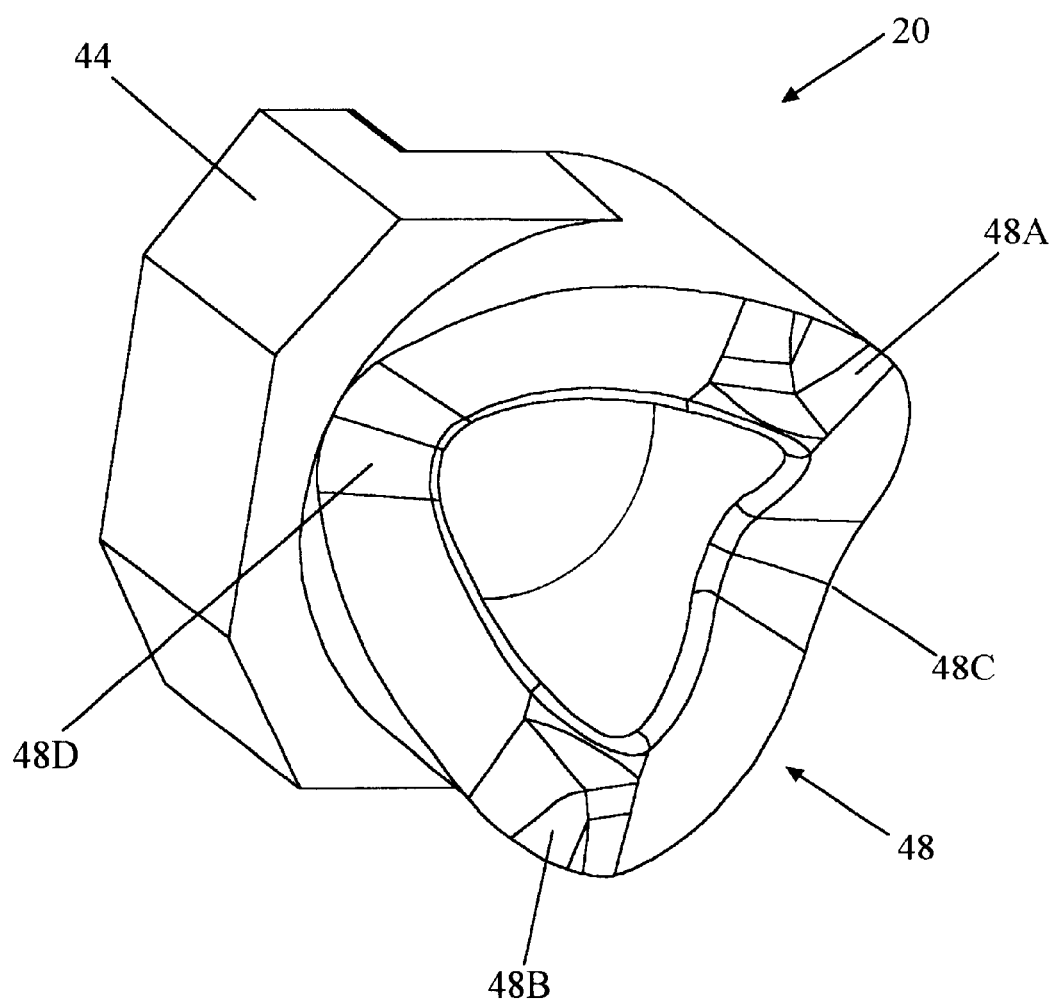

Face cam member 20 is shown in FIGS. 6 and 7 to be of generally cylindrical configuration with a cylindrically shaped through opening 42. Through opening 42 is of sufficient diameter to allow the elongated cam-shaft 18, including lands 34 and 36 to freely extend through cam member 20 a distance until cam member 20 abuts cam-shaft end portion 28. As shown in FIGS. 2 and 6, a curved lip 44 extends both outwardly from the cylindrical surface of cam 20 and beyond the flat end face 46 of cam member 20. When the hinge clutch mechanism 16 is assembled as shown in FIG. 2, lip 44 overhangs cam shaft end portion 28. When cam member 20 is disposed within housing 10 as part of hinge clutch mechanism 16, the lip 44 rests in and engages a compatible opening formed in housing 10, not shown, preventing cam 20 from rotating about its longitudinal axis.

As best shown in FIG. 7, cam member 14 further includes a specially designed, undulating ridge end face 48 confronting cam follower 22. Ridge face 48 is contoured to mate with a confronting ridge end face 50 of cam follower 22 as will be discussed.

Figure 8:
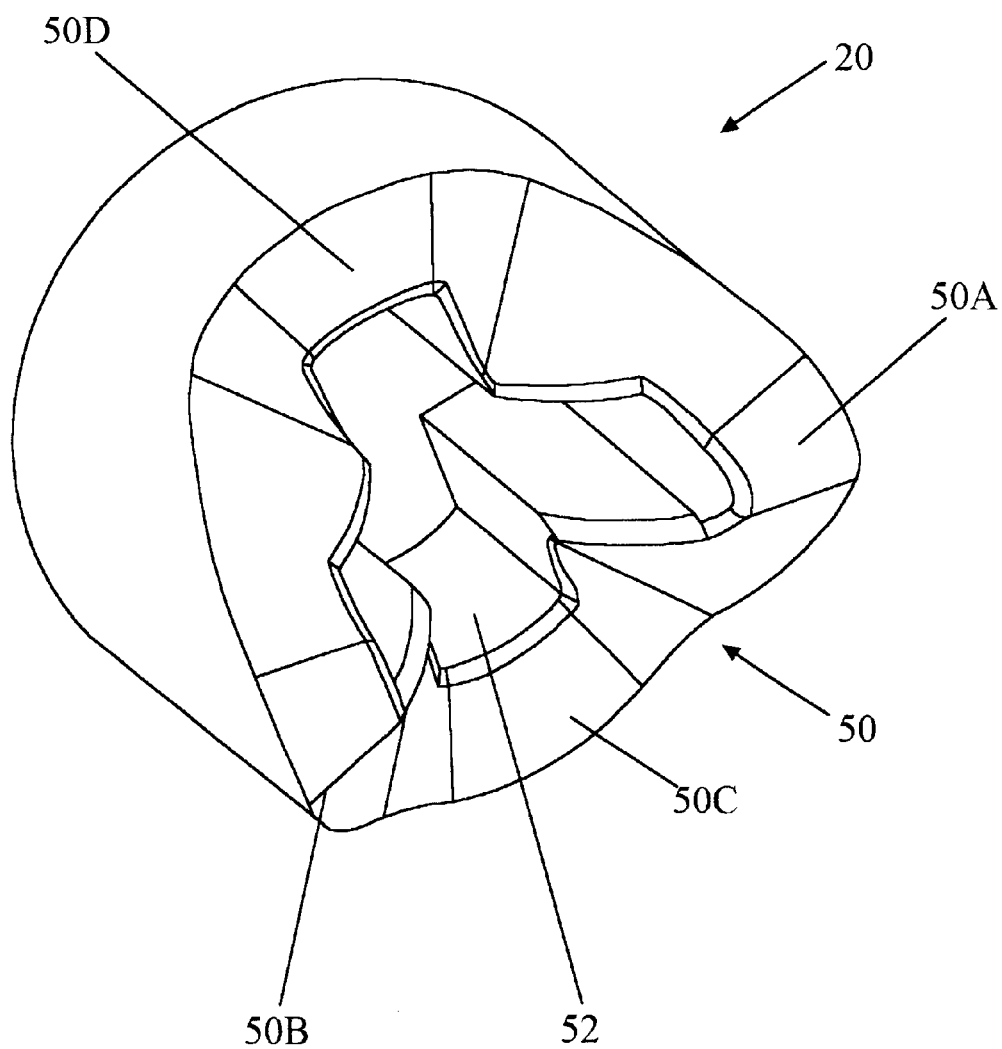
FIGS. 8 and 9 are magnified views of the cam follower employed in the cam clutch assembly of FIG. 3.
Figure 9:
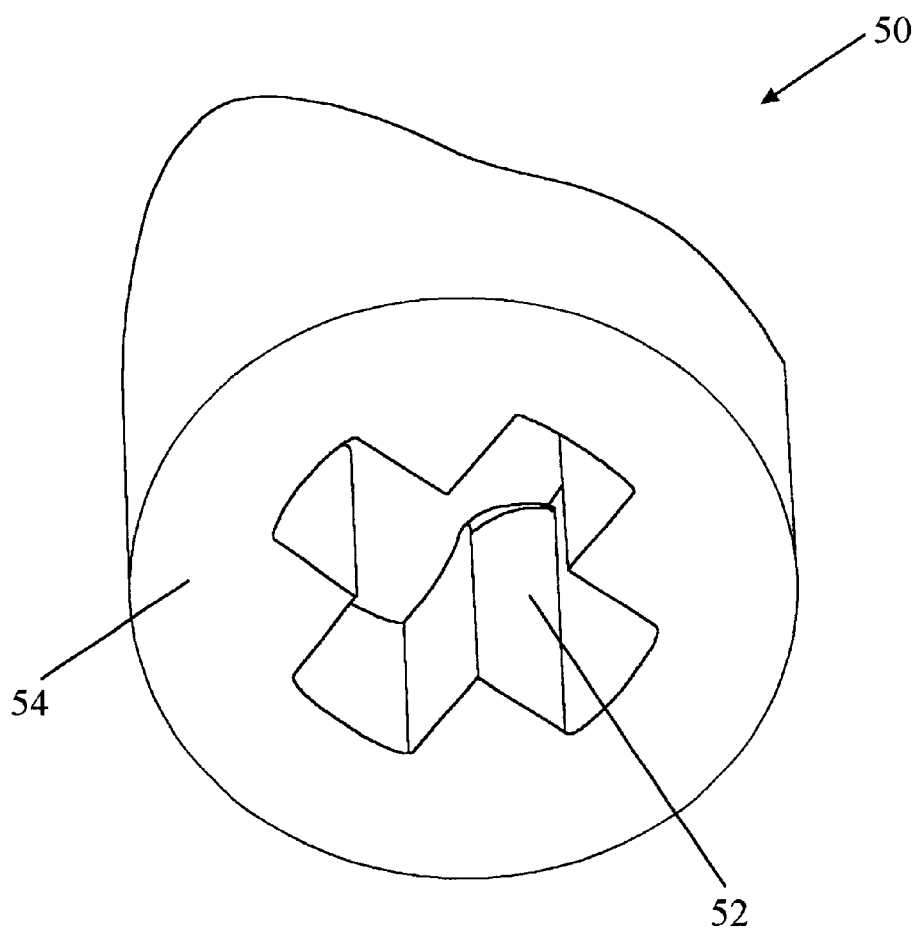

As shown in FIGS. 8 and 9, respectively, cam follower 22 is of generally cylindrical configuration with a centrally disposed through opening 52. Opening 52 has a generally cross-shaped configuration compatible in size to the lands 34 and 36 extending from cam-shaft 18. When assembled, the lands 34 and 36 of cam-shaft 18 pass through opening 52 of cam follower 22. Cam follower 22 can be moved along cam-shaft 18 until its ridge end face 50 is adjacent the confronting ridge end face 48 of cam member 20. Because opening 52 is similar in shape to lands 34 and 36, rotation of cam-shaft 18 causes a similar rotation of cam follower 22.

As shown in FIG. 9, cam follower 22 further includes a flat end face 54 oppositely disposed from ridge end face 50. When hinge clutch mechanism 16 is assembled, a forward end of compression spring 24 abuts end face 54, pressing confronting ridge faces of cam follower 22 cam member 20 against each other. Spring 24 also functions to press cam member 20 against cam-shaft end 28.

Figure 10:
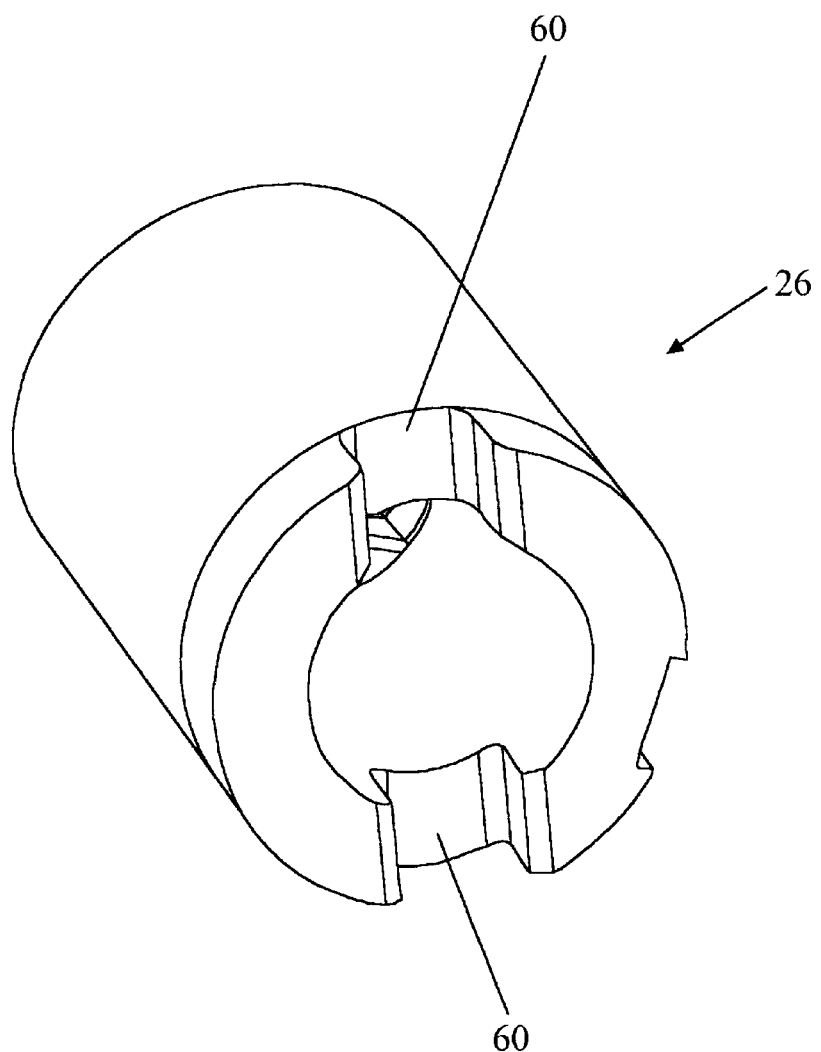
FIGS. 10 and 11 are magnified views of the retaining member employed in the cam clutch assembly of FIG. 3.
Figure 11:
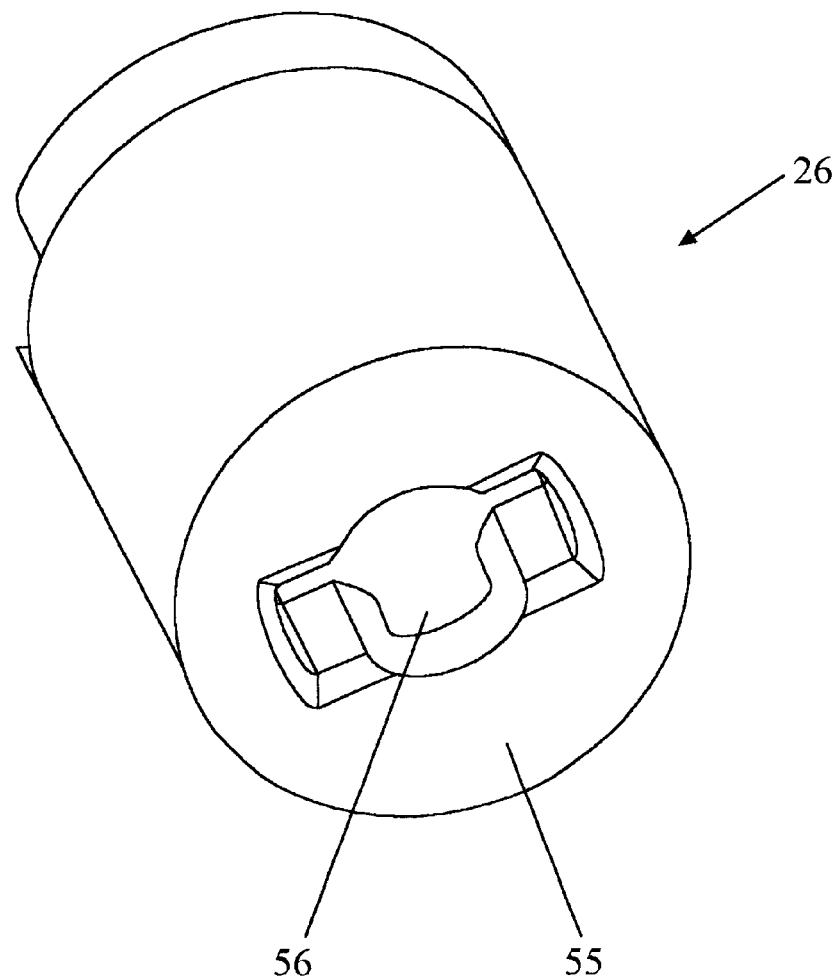
Figure 12:
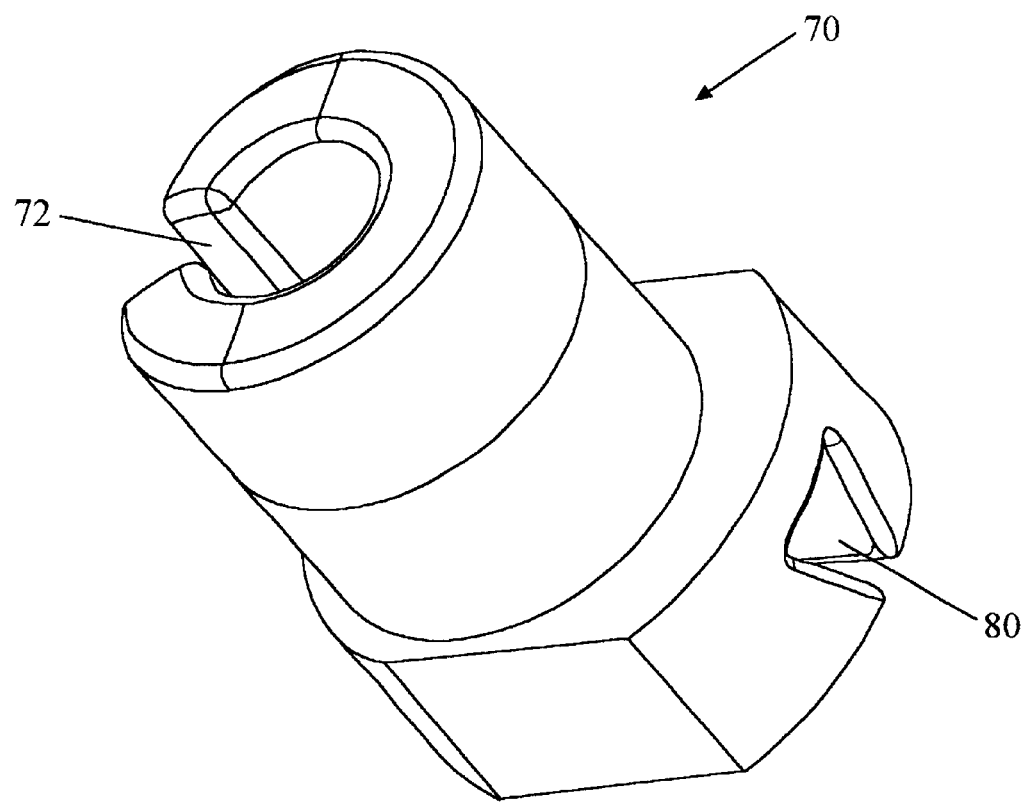
FIGS. 12, 13 and 14 are magnified views of the idler member employed with the cam clutch assembly of FIG. 1.
Figure 13:
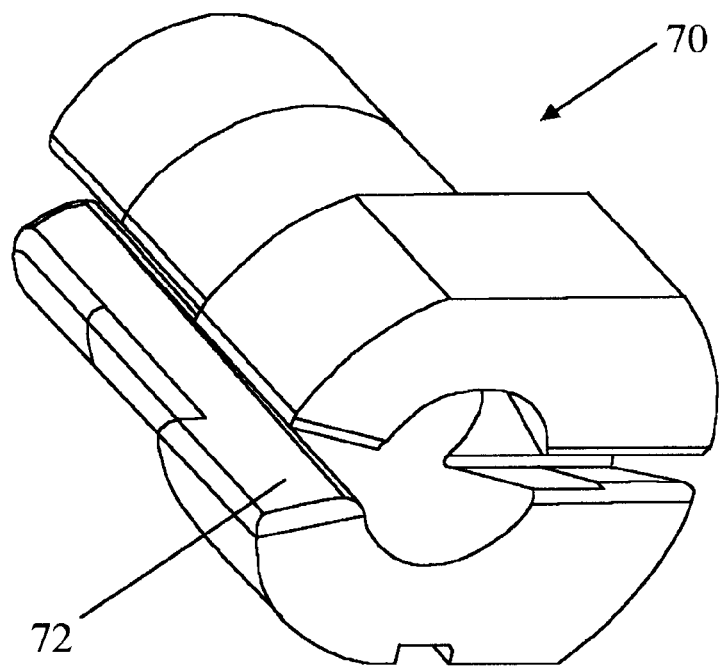
Figure 14:
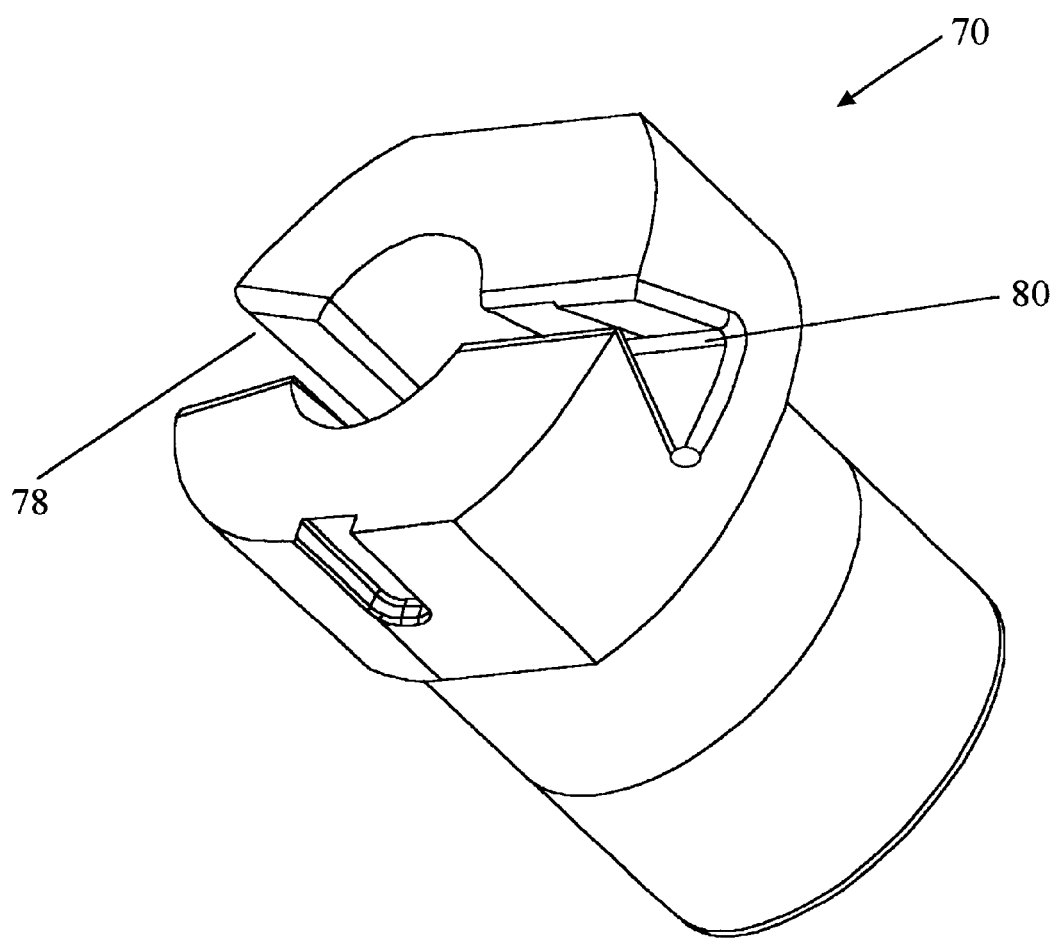

The cylindrically-shaped retaining member 26, are shown in FIGS. 10 and 11 to include an end wall 55 having an opening 56 of substantially rectangular configuration. Opening 56 is compatible in size to the size of overall size of cam-shaft end 38 including protrusions 40. During assembly of hinge clutch mechanism 16, cam-shaft end 38 is inserted through opening 56 of retaining member 26, after which retaining member 26 is then rotated approximately 90°. Such rotation brings protrusions 40 out of alignment with the rectangular shape of opening 56. A rearward end of spring 24 presses against wall 55 of retaining member 26 to maintain wall 55 in contact with protrusions 40, preventing separation of cam-shaft 18 and retaining member 26.

In the present specific embodiment, the undulating cam ridge end face 48 and the confronting, undulating cam follower ridge end face 50 each have two oppositely disposed peaks and two oppositely disposed valleys. Specifically, ridge face 48 has opposite peaks 48a and 48b and opposite valleys 48c and 48d, respectively. Likewise, ridge face 50 has opposite peaks 50a and 50b and opposite valleys 50c and 50d respectively. When a first peak 48a rests in a first valley 50c, cam member 20 assumes a first potential energy state or potential well corresponding to a first stable orientation of the lid portion 30 relative to housing 10 of the electronic device. At the same time the first peak 50a rests in the first valley 48c, the second peak 50b will rest in valley 48d.

When the first peak 48a rests in the second valley 50d, the cam member 20 is in a second potential energy state or potential energy well corresponding to second stable orientation of the lid portion 30 relative to the housing 10 of the electronic device. The potential energies of cam member 20 in the first potential energy state and the second potential energy state are approximately equivalent.

The relative positions of the valleys 48c, 48d and peaks 48a, 48b on the ridge 48 of cam member 20 and on the valleys 50c, 50d and peaks 50a, 50b on the ridge 50 of cam follower 22 are substantially 180° apart; however, open and closed states are only 150–155° apart. The difference, substantially 25–30°, facilitates the stabilization of the first and second stable orientations, corresponding to open and closed states, respectively, of the lid 30 relative to the housing 10 of the electronic device.

When the hinge clutch mechanism 16 is in the first or second potential energy states, the compression spring 24 is in a more decompressed state but remains slightly compressed to maintain a spring-loaded state of the hinge clutch mechanism 16.

The hinge clutch mechanism 16 assumes a third potential energy state when a first peak 48a rides on a first peak 50a and a second peak 48b rides on a second peak 50b. In the third potential energy state, the position of the lid 30 relative to housing 10 of the electronic device is relatively unstable.

Similarly, the hinge clutch mechanism 16 is in a fourth potential energy state when a first peak 48a rides on a second peak 50b. In the fourth potential energy state, the lid 30 and the housing 10 of the electronic device are relatively unstable.

The potential energies of the hinge clutch mechanism 16 in the third and fourth potential energy states are approximately equivalent. When the hinge clutch mechanism 16 is in either the third or fourth potential energy states, the spring 24 is in a more compressed state than when the hinge clutch mechanism 16 is in the first or second potential energy states.

When cam-shaft 18 is caused to rotate by rotation of attached lid 30, the lands 34, 36 on cam-shaft 18 cause cam follower 22 to rotate in a similar direction. While cam follower 22 may rotate, cam member 20 is restrained from rotation by the engagement of curved lip 44 with the compatible cavity, not shown, in housing 10. As cam follower 22 starts to rotate, the ridge end face 50 of cam follower 22 rides on ridge end face 48 of fixed position cam member 20. The only way the undulating ridges 48 and 50 can rotate relative to one another is for cam follower 22 to move away from cam 20 along the longitudinal axis of cam-shaft 18. This axial movement of cam follower 22 causes spring 24 to first compress as the peaks 48a and 50a come into contact with one another and then decompress as the peaks 48a, 48b and 50a, 50b each move into the valleys 48c, 48d and 50c, 50d, respectively. When peaks on the ridge 50 of cam follower 22 ride on corresponding peaks of ridge 48 of cam 20, the spring 24 is maximally compressed and the hinge clutch mechanism 16 assumes its relatively unstable state. In this relatively unstable state, the tangential resistance about the longitudinal axis of cam-shaft 18 is relatively small. When the valleys 48c and 48d on the ridge 48 of cam 20 ride on the corresponding peaks 50a and 50b of the ridge 50 of cam follower 22, the hinge clutch mechanism 16 is in a relatively stable state and the spring 24 is minimally compressed. The tangential resistance about the longitudinal axis of cam-shaft 18 is relatively large.

When the lid 30 of the electronic device is in its fully closed or fully open position, the peaks of either the cam follower 22 or the cam member 20 are adjacent the valleys of the other component. In order to rotate the lid 30 from its closed to its open or from its open to its closed position, it will be necessary to apply sufficient force to over come the resistance exerted by spring 24. Sufficient force will be needed to move the peaks of cam follower 22 past the peaks of cam member 20. Once facing peaks are passed, the action of the spring 24 actually assists in completing the rotation of the lid 30 to its fully open or closed position, respectively.

As shown in FIG. 10, retaining member 26 is formed with a pair of indentations 60 of sufficient size to insert a small screwdriver or similar tool. During assembly or disassembly of hinge clutch mechanism 16, retaining member 26 can be moved along the axis of cam-shaft 18 by inserting such a tool into one of the indentations 60 and pressing in the direction of cam follower 22. This action serves to collapse the hinge clutch mechanism 16 by compressing spring 24. Once the mechanism is sufficiently compressed, it may be easily removed from the housing 10 of the electronic device. To assist in the removal, a buttress 64 may be molded or otherwise mounted in housing 10, see FIG. 1, and disposed such that a small pair of pliers may have one end applied to buttress 64 and the remaining end inserted into one of the indentations 60. By squeezing the pliers, spring 24 is compressed, allowing retaining member 26 to slide towards cam follower 22.

Figure 15:
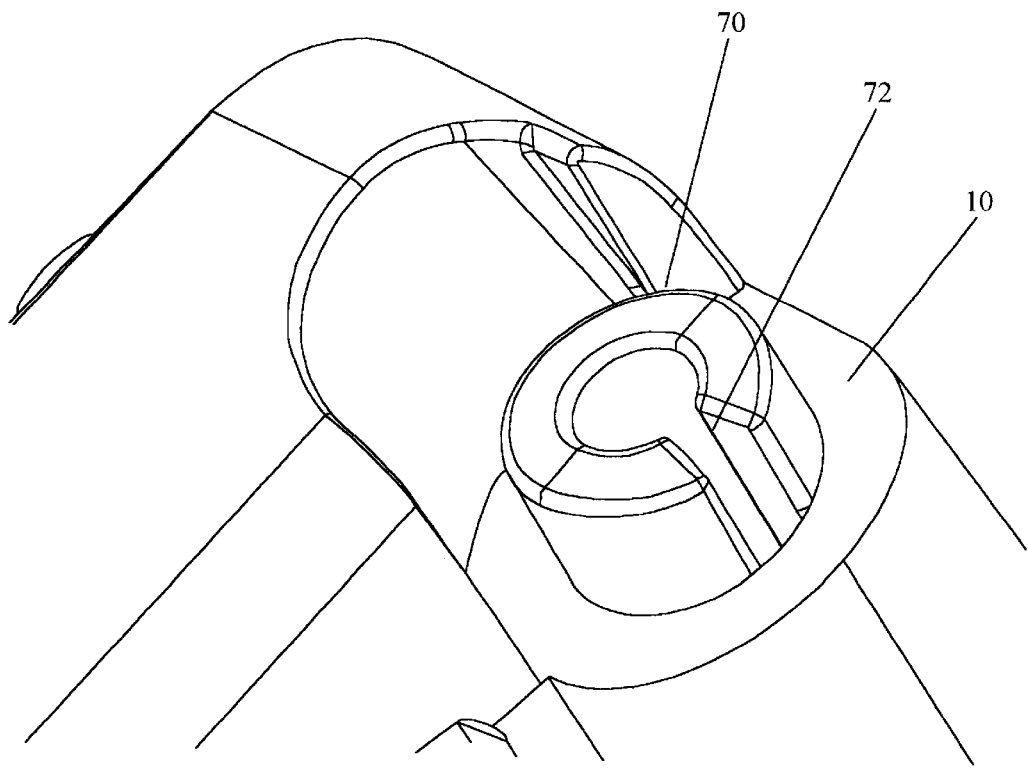
FIG. 15 is a partial assembled view of the idler of FIG. 12.

As shown in FIGS. 1 and 12–14, a separate idler 70 is positioned in housing 10 adjacent to retaining member 26. Idler 70 is preferably formed of plastic or similar cost effective material. Spring 24 presses retaining member 26 into frictional contact with idler 70. Idler 70 includes a substantially "C" shaped end portion 72 which extends through a portion of housing 10, see FIG. 15. Because of the non-symmetrical shape of idler 70, it will not rotate relative to housing 10.

Idler 70 includes a dove-tailed opening 80 extending from a central passageway 78 through a side wall to the external surface. When assembled, wire or flexible cable joining housing 10 to lid 30 may pass through slit 76, passageway 78 and dove-tailed opening 80. Because of the continuous passageway through idler 70 and the fact that idler 70 is fixed against rotation, the wire 70a will not be pinched or torn when lid 30 is rotated between its fully open and fully closed positions. The dove-tailed opening 80 further serves to prevent any connecting wire 70a from slipping out of proper alignment during repeated opening and closing of lid 30.

During disassembly, after retaining member 26 is pressed toward cam follower 22, compressing spring 24, cam-shaft 18 may be removed from housing 10. At this point, idler 70 may be separated from housing 10.

All parts of the hinge clutch mechanism 16 of the present invention may be molded or formed or machined by processes well known to one of ordinary skill in the art.

Thus the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A space efficient and cost effective hinge clutch mechanism for facilitating the positioning of a rotatable member of a portable electronic device relative to a housing of the device, comprising:

a rotatable, elongated cam shaft;

a non-rotatable face cam member mounted on said cam-shaft;

a cam follower mounted on said cam-shaft for joint rotation therewith;

a substantially cylindrical retaining member mounted on said cam-shaft, said retaining member including means for preventing said cam shift from being inadvertently withdrawn from engagement with said retaining member; and a compression spring compressed between said retaining member and said cam follower for biasing confronting faces of said cam follower and said cam member, whereby rotation of said cam-shaft causes similar rotation of said cam follower relative to said cam member;

wherein said retaining member includes at least one indentation in its outer, curved surface, whereby pressure against the indentation causes the retaining member to move toward the cam follower, compress the spring extending therebetween.

2. A space-efficient hinge clutch mechanism for facilitating the positioning of a rotational member of a portable electronic device relative to housing of the device comprising:

first means for providing tangential resistance to movement of said rotational member and second means for preventing inadvertent separation of said mechanism;

including a third means disposed in said housing for preventing damage to any wires extending between paid rotational member and said housing;

wherein said third means comprises an idler disposed adjacent to said second means and formed with a through passageway for surrounding and supporting said wires, with said housing preventing the idler from rotating with said hinge mechanism;

wherein a hollow idler is disposed adjacent to said retaining member, said idler including a through passageway for surrounding and supporting wires extending between said rotation member and said housing of said portable electronic device;

wherein said idler is non-rotatably mounted in said housing to prevent said wires from being pinched or broken;

wherein said idler includes a slit extending along the entire longitudinal axis of the idler and further includes a dove-tailed opening extending joining said slit to surround and support said wires extending though said idler.

3. A method for facilitating the positioning of a rotational member of a portable electronic device relative to the housing of said device, comprising the steps of:

extending an elongated cam-shaft through aligned opening in a face cam, a cam follower, a compression spring and a retaining member to create a hinge clutch mechanism;

rotating said retaining member approximately 90° to prevent with drawl of said cam-shaft from inside of said retaining member;

disposing said hinge clutch mechanism within an opening in said housing; and attaching said lid to an end of said cam-shaft remotely positioned from said retaining member;

including the further stop of positioning an idler in the opening in said housing prior to deposing said clutch mechanism such that said idler is adjacent to said retaining member.

* * * * *